US011055261B2

(12) United States Patent
Chen et al.

(10) Patent No.: US 11,055,261 B2
(45) Date of Patent: Jul. 6, 2021

(54) IN-APPLICATION SUPPORT FOR TOPOLOGICAL CHANGES TO FILES DURING REMOTE SYNCHRONIZATION

(71) Applicant: MICROSOFT TECHNOLOGY LICENSING, LLC, Redmond, WA (US)

(72) Inventors: Yisheng Chen, Issaquah, WA (US); Tejprakash Singh Gill, Bellevue, WA (US); Kevin Paschal D'Souza, Sammamish, WA (US); George N. Armah, Kirkland, WA (US); Brian David Jones, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/979,113

(22) Filed: May 14, 2018

(65) Prior Publication Data

US 2019/0266258 A1 Aug. 29, 2019

Related U.S. Application Data

(60) Provisional application No. 62/636,705, filed on Feb. 28, 2018.

(51) Int. Cl.
*G06F 16/178* (2019.01)
*G06F 16/25* (2019.01)
(Continued)

(52) U.S. Cl.
CPC ............ *G06F 16/178* (2019.01); *G06F 16/16* (2019.01); *G06F 16/182* (2019.01); *G06F 16/23* (2019.01); *G06F 16/252* (2019.01)

(58) Field of Classification Search
CPC ...... G06F 16/16; G06F 16/178; G06F 16/182; G06F 16/252; G06F 16/23
See application file for complete search history.

(56) References Cited

U.S. PATENT DOCUMENTS 9,292,387 B2 * 3/2016 Itasaki ................ G06F 11/1458
9,934,303 B2 * 4/2018 Newhouse ............ G06F 16/182
(Continued)

OTHER PUBLICATIONS

"Save the Changes Done to a Document Over Cloud When Save on the Disk Fails", Published in Journal of ip.com, ip.com Disclosure No. IPCOM000222131D, Sep. 19, 2012, 5 Pages.
(Continued)

*Primary Examiner* — Amresh Singh
(74) *Attorney, Agent, or Firm* — Newport IP, LLC; David W. Foster; Scott Y. Shigeta

(57) ABSTRACT

A system is provided for enabling in-application support for topological changes to local files during remote synchronization. The techniques disclosed herein solve the problems of existing systems by mitigating conflict states and loss of edits being made to a file during synchronization. In addition, the techniques disclosed herein enable a user to interact directly with a productivity application to rename and/or move a file. The techniques disclosed herein provide an improved user experience and more efficient methods for interacting with files in that a user does not have to exit a productivity application and interact with an operating system interface to rename and/or move a file. A productivity application can operate in a server mode or a client mode depending on a validity of a requested destination location for a file.

20 Claims, 9 Drawing Sheets

(51) Int. Cl.
*G06F 16/16* (2019.01)
*G06F 16/23* (2019.01)
*G06F 16/182* (2019.01)

(56) References Cited

U.S. PATENT DOCUMENTS

| | | | |
|---|---|---|---|
| 10,397,319 B2* | 8/2019 | Kaplan | G06F 16/178 |
| 2010/0250615 A1* | 9/2010 | Reghetti | G06F 30/00 |
| | | | 707/802 |
| 2014/0337290 A1 | 11/2014 | Uraltsev et al. | |
| 2014/0365432 A1* | 12/2014 | Jain | G06F 16/182 |
| | | | 707/610 |
| 2017/0270136 A1 | 9/2017 | Chen et al. | |

OTHER PUBLICATIONS

Nebeling, et al., "MUBox: Multi-User Aware Personal Cloud Storage", In Proceedings of the 33rd Annual ACM Conference on Human Factors in Computing Systems, Apr. 18, 2015, pp. 1855-1864.

"International Search Report and Written Opinion Issued in PCT Application No. PCT/US2019/018447", dated May 22, 2019, 18 Pages.

* cited by examiner

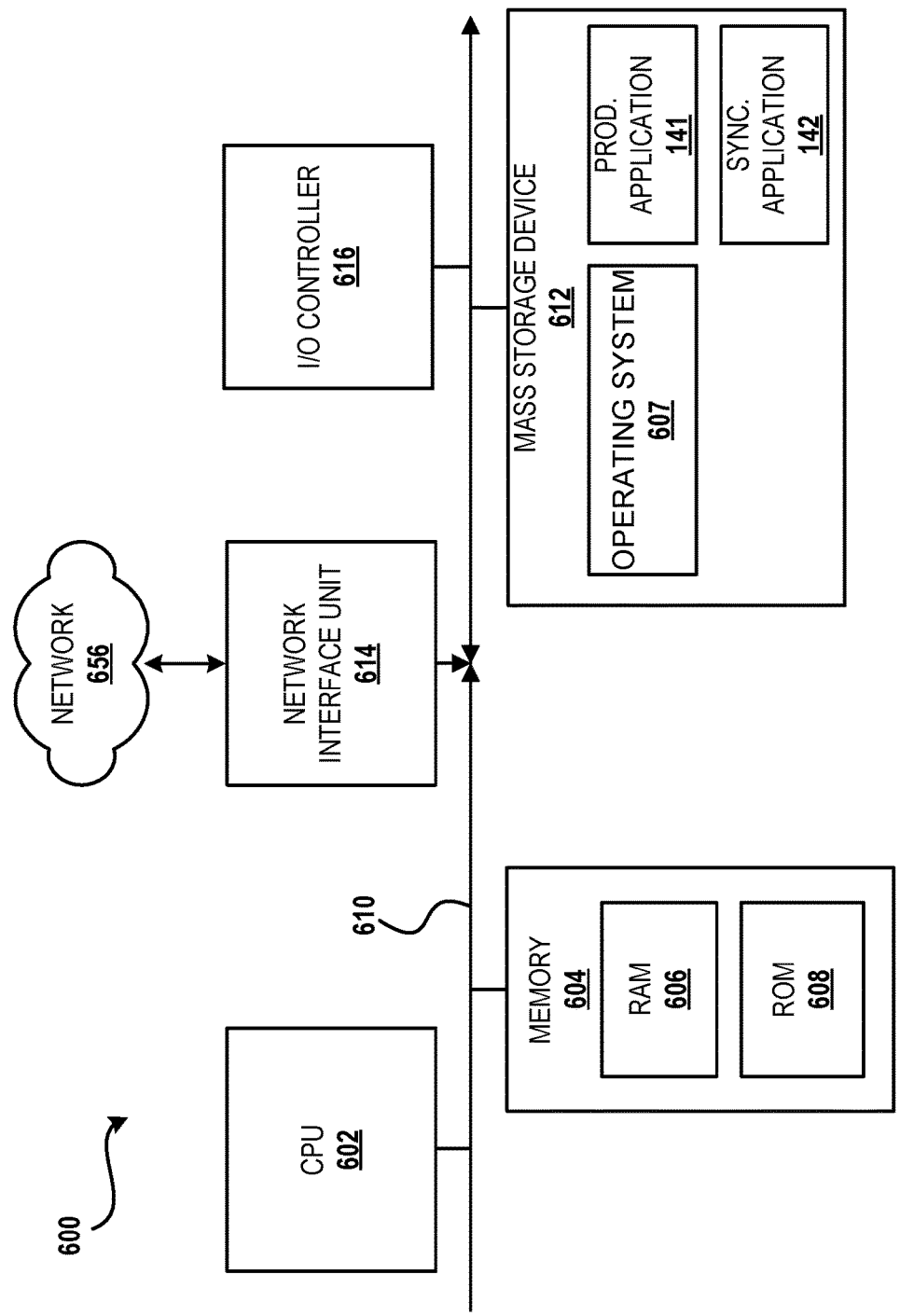

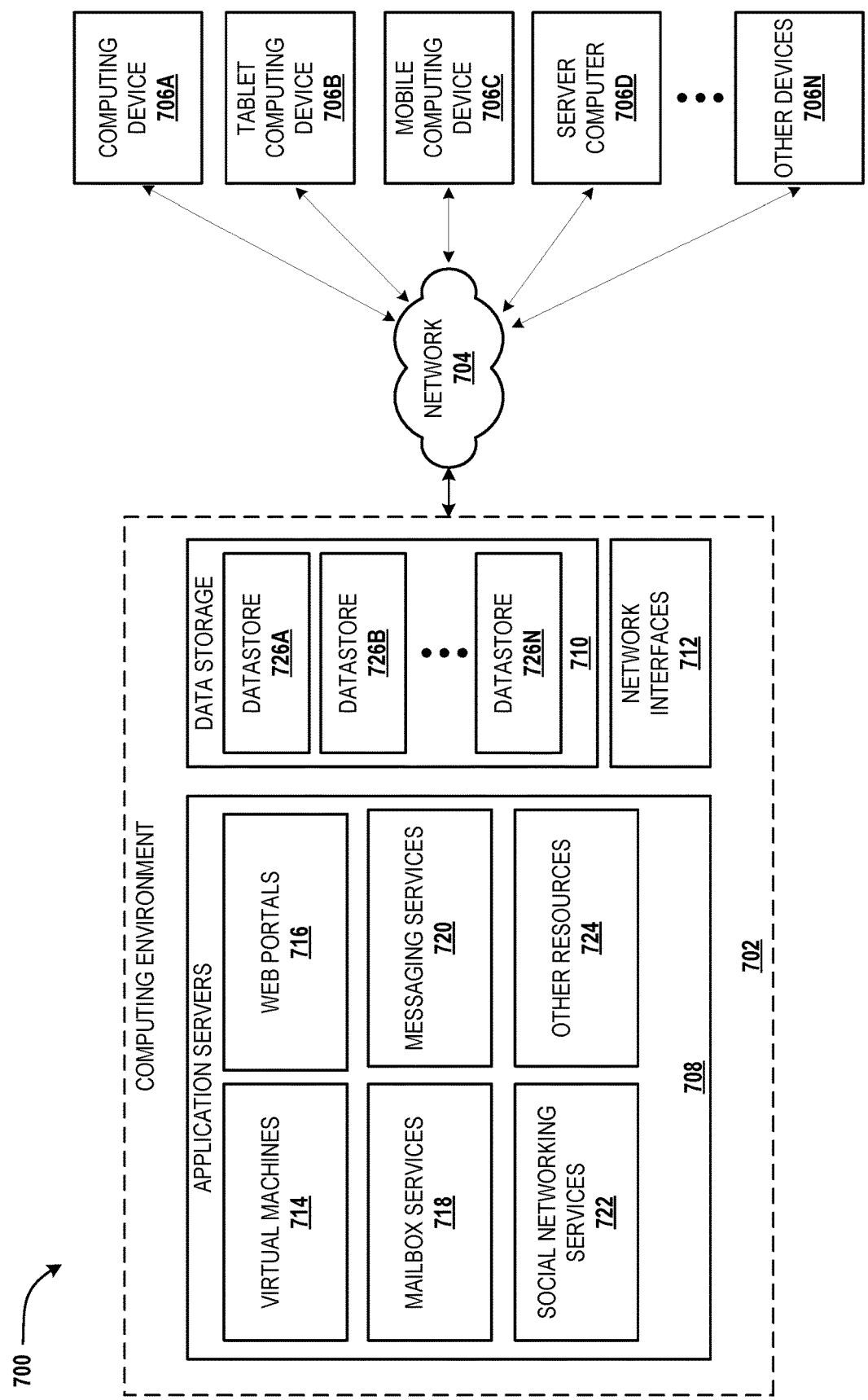

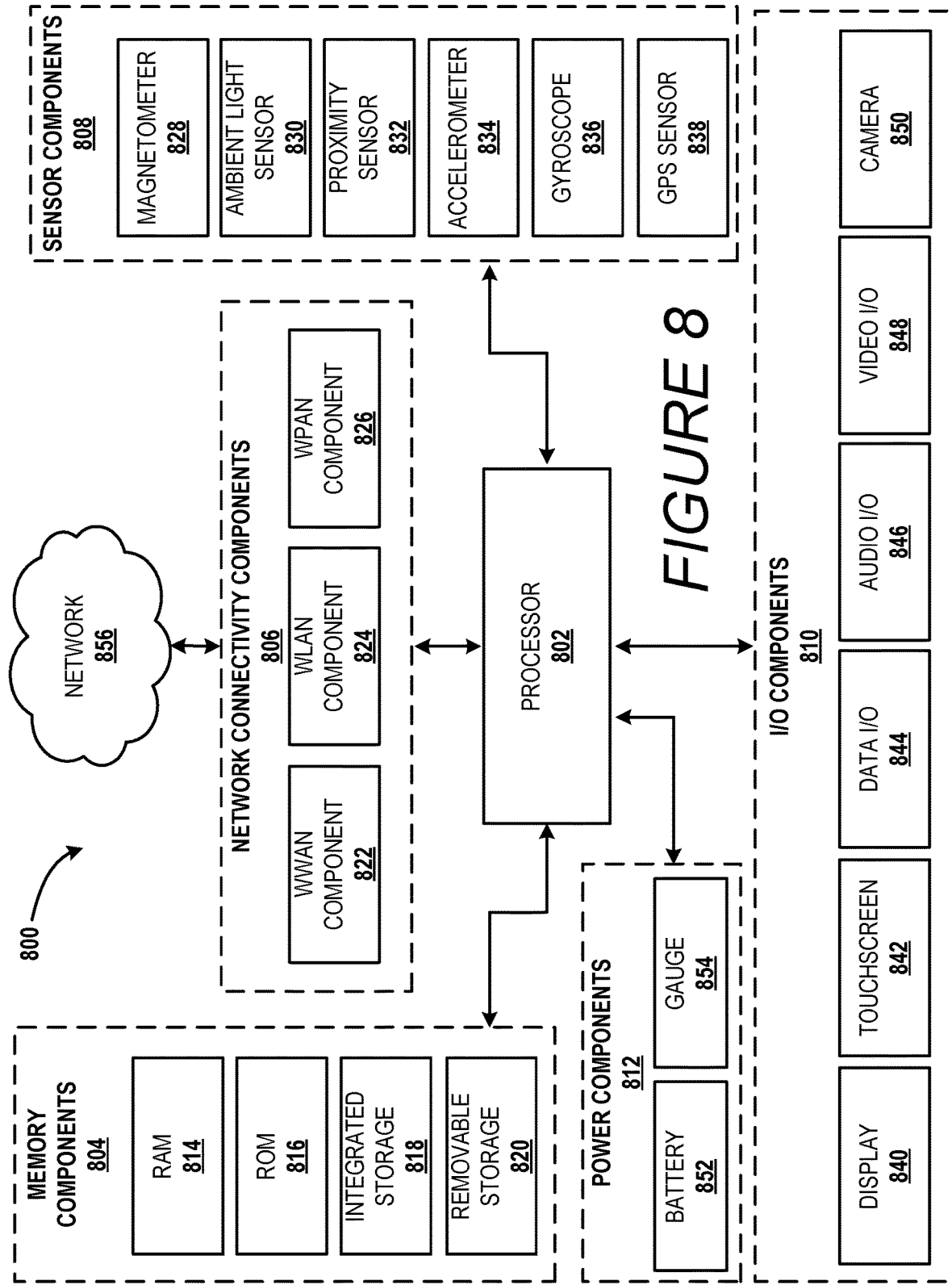

IN-APPLICATION SUPPORT FOR TOPOLOGICAL CHANGES TO FILES DURING REMOTE SYNCHRONIZATION

CROSS-REFERENCE TO RELATED APPLICATIONS

This application claims priority under 35 U.S.C. § 119(e) to U.S. Provisional Patent Application No. 62/636,705, filed on Feb. 28, 2018 and titled "IN-APPLICATION SUPPORT FOR TOPOLOGICAL CHANGES TO FILES DURING REMOTE SYNCHRONIZATION," the entire disclosure of which is expressly incorporated in its entirety by reference herein.

BACKGROUND

In many productivity applications, such as Word, Excel, OneNote, Pages, Numbers, Google Docs, and Google Sheets, each application has specialized tools for displaying and manipulating the contents of a file. Although such applications can help users edit the contents of a file, most existing productivity applications have limitations with respect to modifying certain aspects of a file. For instance, existing productivity applications do not allow users to rename a file or change a location of a file within a storage directory. To make such changes, a user has to (1) close the file in the productivity application or close the application, (2) locate the file using a separate application, such as a File Explorer, (3) rename the file and/or move the file using the separate application, then (4) reopen the renamed file using the productivity application to continue with any edits. This cumbersome process can lead to a number of inefficiencies, as the user is required to pause any productivity and coordinate steps in separate applications to rename and file or move a file to a new location.

The above-described inefficiencies and other issues can be exacerbated when the file is stored at a remote service, such as Google Drive, iCloud, OneDrive, etc. Changes to a file name or changes to a file location may cause synchronization issues and delays, particularly when a number of users are editing a document at the same time. Typically, a user has to wait for synchronization to be completed before he or she can rename or move a file, and these tasks cannot be completed while the file is opened by a productivity application. Such limitations can cause a number of inefficiencies and a less than desirable user experience.

SUMMARY

The techniques disclosed herein enable a user to move and rename a file using a productivity application, and allow such modifications to occur while the file is open for editing and while allowing synchronization of the file with a remote storage service. The techniques disclosed herein solve the problems of existing systems by mitigating conflict states and loss of edits being made simultaneously to a file by different users, while also allowing synchronization of the file with a remote storage service. In addition, the techniques disclosed herein enable a user to interact directly with a productivity application to rename and/or move a file. The techniques disclosed herein provide an improved user experience and more efficient methods for interacting with files in that a user does not have to exit a productivity application and interact with an operating system to rename and/or move a file.

In one illustrative example, consider a scenario where a client computing device is executing a productivity application that has a locally-stored file open for editing. The client computing device is also executing a synchronization application that coordinates the synchronization of the locally-stored file with a remote copy of the file stored at a remote storage service, such as OneDrive, Dropbox, Google Drive, etc. When a user desires to make topological changes to the locally-stored file, e.g., desires to rename the file and/or move the file to a new directory location, the user can provide an input directly to the productivity application. The input can be in the form of a request, which can be communicated by a gesture, text input, voice input, or any other suitable form of input that can define an updated filename and/or a requested directory location (also referred to herein as a destination location). The productivity application can communicate with the synchronization application to determine if the requested directory location is valid. As described in more detail below, the validity of the requested directory location can be based on one or more criteria. For example, a requested directory location may be invalid if a folder associated with the requested directory location does not exist on the client computing device or if a user does not have the appropriate permissions to the folder.

When the requested directory location is determined to be invalid, the productivity application unlocks the local file to enable the synchronization application to make changes to the local file. The productivity application communicates the contents of the local file and metadata associated with the local file to the remote storage service. The metadata defines the requested directory location and/or the updated file name. In response to receiving the metadata, the remote storage service stores the contents in a remotely-stored file using the updated file name and the requested directory location. The productivity application also transitions to a server mode, in which edits provided by the user through the productivity application are communicated to the remote storage service, and the edits are saved directly in the remotely-stored file. The remote storage service also communicates with the synchronization application and causes the synchronization application to remove the locally-stored file. The remote storage service can also cause the synchronization application to update a database record indicating the requested directory location and the updated filename of the remotely-stored file and reflect the removal of the locally-stored file.

When the directory location is determined to be valid, e.g., the location exists on the client computer and appropriate access permissions exist, the productivity application moves the locally-stored file from an originating folder to the requested directory location on the local storage of the computing device. The productivity application remains in a client mode, where edits provided by the user are directed to the locally-stored file. The productivity application also communicates metadata and the contents of the locally-stored file to the remote storage service, where the remote service stores the contents in a synchronized, remotely-stored file. The metadata causes the remote service to save the remotely-stored file according to the requested directory location and the updated file name. In addition, the remote service communicates the requested directory location and the updated file name to the synchronization application causing the synchronization application to update a database record indicating the requested directory location and the updated filename.

The techniques disclosed herein provide a number of improvements over existing systems. For instance, when the file is stored at a remote service, such as Google Drive, iCloud, OneDrive, changes to a file name or changes to a file location may be performed while a user is editing the file in an application. The techniques disclosed herein improve user interaction with a computer along with providing improvements with respect to processing resources, network resources, and memory resources. For instance, a user no longer has to wait for synchronization with a remote service to be completed before he or she can rename or move a file. The delay of such tasks is no longer an issue. The user can also complete such tasks while the file is opened by a productivity application. Improved user interaction can lead to the reduction of inadvertent inputs, and based on which other efficiencies, including production efficiencies and network usage efficiencies, can be improved.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 6 is a computer architecture diagram illustrating an illustrative computer hardware and software architecture for a computing system capable of implementing aspects of the techniques and technologies presented herein.

FIG. 7 is a diagram illustrating a distributed computing environment capable of implementing aspects of the techniques and technologies presented herein.

FIG. 8 is a computer architecture diagram illustrating a computing device architecture for a computing device capable of implementing aspects of the techniques and technologies presented herein.

DETAILED DESCRIPTION

Figure 1:
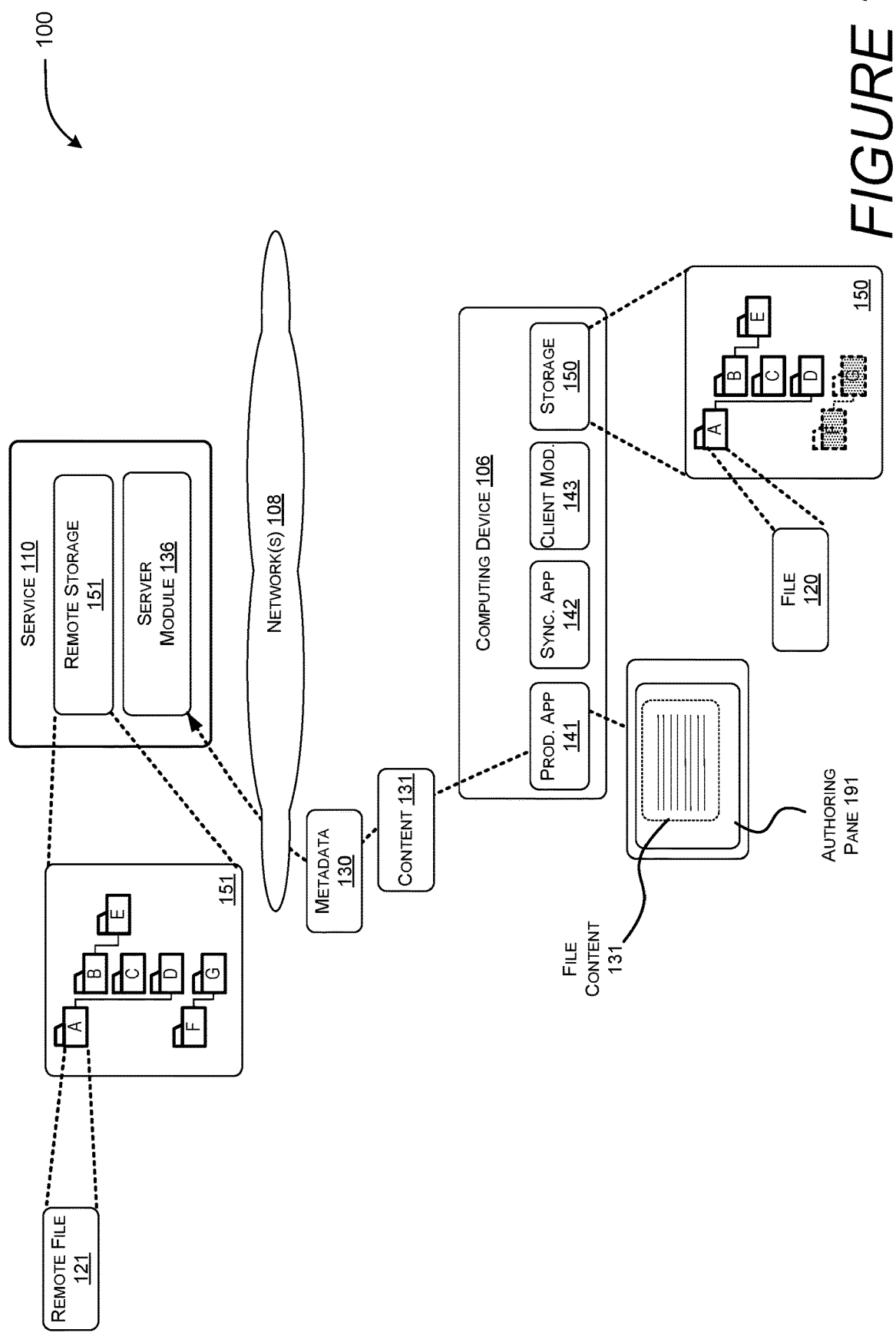
FIG. 1 is a block diagram of a system for enabling in-application support for topological changes to files during remote synchronization.

FIG. 1 illustrates a system 100 that enables users to move and rename a file using a productivity application, and allow such modifications to occur while the file is open for editing and while allowing synchronization of the file with a remote storage service. In one illustrative example, the system 100 comprises at least two computing devices: a client computing device 106 and a server computer operating a remote storage service 110 (also referred to herein as a "remote service 110"). The system 100 can also include one or more networks 108 for enabling the computing devices to communicate. This example is provided for illustrative purposes and is not to be construed as limiting. It can be appreciated that the system 100 can include any number of computers, including a number of client computers simultaneously editing a single file stored at the client computers and one or more server computers facilitating the remote storage service 110.

The remote service 110 can be in the form of a personal computer, a server farm, a large-scale computer system or any other computing system having components for processing, coordinating, collecting, storing, and/or communicating data between one or more computing devices. Examples of such services include storage services provided by Dropbox, Microsoft, Amazon, Apple, Google, etc.

The service 110 can include a server module 136 for executing aspects of the operations disclosed herein. In addition, the service 110 can also include one or more storage units 151, also referred to herein as "remote storage 151." The remote storage 151 can comprise a storage structure that defines a number of directory locations. For instance, the remote storage 151 can include a directory structure having a plurality of folders, e.g., locations (A through G). The folders may have a hierarchy, as shown in FIG. 1, and each folder can store one or more files.

The client computing device 106 can be in any suitable form, such as a phone, laptop computer, desktop computer, tablet, etc. The client computing device 106 can include a productivity application 141, a synchronization application 142, a client module 143, and local storage 150. The client module 143 can provide functionality for executing aspects of the operations disclosed herein, which can be in coordination with the server module 136.

The productivity application 141 provides functionality for enabling users to edit the contents 131 of a file 120. For instance, a productivity application 141 can include a word processing application that edits text and images within a document. In other examples, the productivity application 141 can include a spreadsheet application, a presentation application, a drawing application, or any other suitable application for editing the contents 131 of a file 120. The content of the file can include text data, image data, video data, mark-up language, or data of any other format that can define an idea, object, description, images, preferences, etc. In some configurations, the productivity application 141 can display a graphical user interface displaying an authoring pane 191 for displaying the contents 131 of the file 120.

The synchronization application 142 manages files and the folders stored on the client computing device 106 and synchronizes the files and folders with the remote storage service 110. The synchronization application 142 manages aspects of the namespace of the client computing device 106. For illustrative purposes, a typography namespace modification to a file includes a modification of the file name and/or a modification to the location of the file. A file may move from an originating location to a destination location. Renaming a file and/or moving a file to a destination location is also referred to herein as a modification to a file's namespace topography. The synchronization application 142 can maintain a database with respect to files stored on the client computing device 106. The database can comprise a number of file attributes, including a filename and a directory location, which can be used to coordinate file synchronization with the service 110.

The productivity application 141 and the synchronization application 142 can communicate with one another to coordinate the status of a stored file. For instance, the productivity application 141 can lock a file while a user is editing the file. While a file is locked, the productivity application 141 can prevent the synchronization application 142 from applying any changes to the file. In some configurations, a file is locked when the file is open by the productivity application 141 for editing. The productivity application 141 can also send requests to the synchronization application 142 to obtain additional information about a file. In response, the synchronization application 142 can provide information regarding a file, e.g., machine identifier to indicate a computer on which edits are made, and other data indicating when a file was last synchronized with the remote service 110. Such information can enable the productivity application 141 to coordinate with the service 110.

The local storage 150 can comprise a structure that defines a number of file locations. For instance, the local storage 150 can include a directory structure having a plurality of folders (A through D). The folders may have a hierarchy, as shown in FIG. 1, and each folder can be used to store one or more files. For illustrative purposes, the local storage 150 includes five (5) valid folders (A through D) and two invalid folders (F and G). Additional details describing valid and invalid folders are provided below.

A process of modifying a namespace topography of a file 120 while allowing file synchronization with a remote service 110 can begin with a request. A request can be in any suitable format, which may include a voice command captured by a microphone, a keyboard input, an input captured by a pointing device, an input captured by a camera directed to a user performing a gesture, or any other type of input caused by a user or a computer.

The request can identify a desired directory location where the file is to be stored. The location can be identified in a number of ways, for instance, the location can be identified by a path of file directories, an address, a namespace, or any other suitable data indicating a location within a directory structure. In one illustrative example, the location can include a OneDrive namespace. For illustrative purposes, the location provided in the request is also referred to herein as a "requested location."

The request can also identify an updated file name. When a user desires to rename a file, the user can provide text or other information in any suitable format defining an updated file name. For illustrative purposes, a file rename operation can be also described herein as a type of move operation. Also, a file rename operation can be distinguished from a "save as" operation. A file rename operation changes the name of a particular file. Whereas, a "save as" operation stores a new copy of a file upon receipt of a path and file name, thereby making multiple copies of the file.

In response to the request, productivity application 141 can determine if the requested directory location is a valid or an invalid directory location on the local storage 150. A location can be determined to be valid or invalid using a number of different methods. For instance, a directory location may be determined to be valid when an associated folder exists on a local storage 150 and when a user has the appropriate access permissions to the folder.

In one illustrative example, a requested directory location may be determined to be invalid when an associated folder does not exist on the local storage 150. In addition, a requested directory location may be determined to be invalid when an associated folder has not been selected for synchronization with the remote service 110, or when a user does not have appropriate access permissions. These examples are provided for illustrative purposes and are not to be construed as limiting. The techniques disclosed herein can utilize other factors and conditions to determine when a directory location, e.g., a folder, is valid or invalid.

In one illustrative example, a requested directory location may be determined to be invalid when a directory location does not meet one or more criteria. The criteria can be defined in a preference file. For example, when a preference file indicates that a user has selected a folder to be exclusively stored at the remote service, that folder may be determined as not meeting one or more criteria and deemed as invalid. However, when the preference file indicates that a user has selected a folder to be stored at the remote service and stored at one or more local computers, that folder may be determined as meeting one or more criteria and deemed as valid.

To illustrate aspects of the present disclosure, FIG. 1 also includes an example where it is a given that folders F-G are invalid locations for the client computer 106. It is also a given that folders A-D are valid locations for the client computer 106. It is also a given that the file 120 opened by the productivity application 141 is originally opened stored in Folder A, the originating directory location of the file 120.

When the requested location is determined to be invalid, the productivity application 141 operates in a server mode and the contents of the file 120 are communicated to the remote service 110. The remote service 110 stores the contents in a remotely-stored file 121 stored on the remote storage 151 at the directory location using the updated file name. While in server mode, all edits to the file 120 made by the user at the productivity application 141 are communicated directly to the remotely-stored file 121 stored on the remote storage 151. In addition, while in server mode, the productivity application 141 does not save edits received by the user to the locally-stored file 120. Thus, in the example of FIG. 1, if Folders F or G are selected as requested location, the productivity application 141 would operate in a server mode.

When the requested location is determined to be invalid, the productivity application 141 also unlocks the file 120 allowing the synchronization application 142 to modify the locally-stored file 120. In addition, when the requested location is determined to be invalid, the service 110 causes the synchronization application 142 to remove the locally-stored file 120 from the local storage 150. The synchronization application 142 also updates a database record maintained by the synchronization application 142. The record can be updated to associate the requested directory location and/or the updated filename with the remotely-stored file 121. The record can also be updated to indicate that the locally-stored file 120 has been removed from the local storage 150. Thus, in the example of FIG. 1, if either Folder F or Folder G is selected as requested location, the productivity application 141 would operate in a server mode and store the renamed file at the requested location, e.g., Folder F or Folder G. For illustrative purposes, the present disclosure may describe a file that is stored at a location. In some configurations, metadata describing a directory location may be used for addressing purposes to enable a system to give the appearance that a file is stored in a particular location in a directory structure. Thus, a file can be stored using a directory location, thus giving the appearance that the file is stored at the location. In addition, a file can be described as being moved from an original location to a destination location. In some configurations, the file may not be physically moved but the metadata may include addressing information to give a user the appearance that a file has moved within a directory structure to a destination location.

Figure 2:
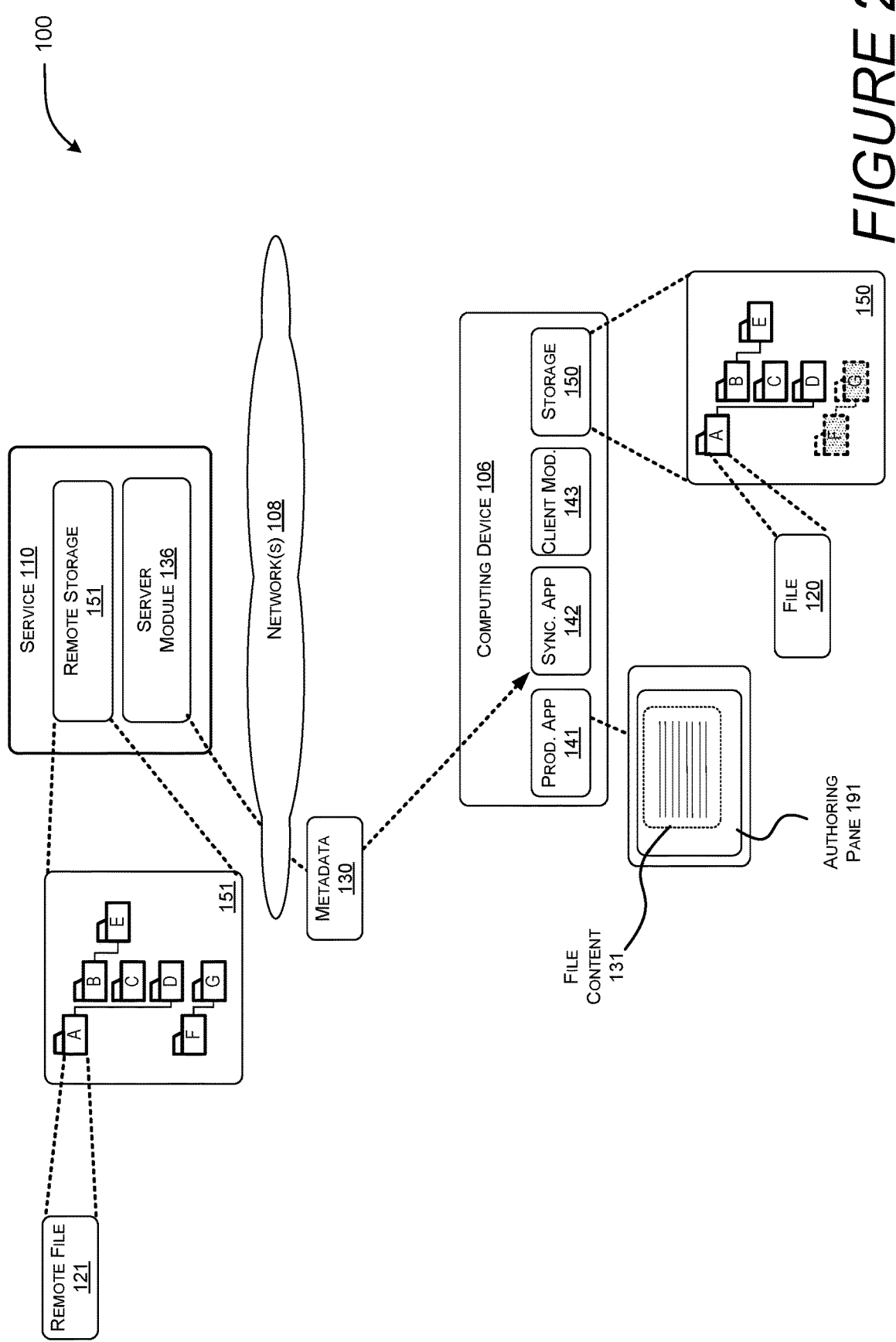
FIG. 2 is a block diagram of a system of FIG. 1 showing metadata that is communicated to and from a remote service to a synchronization application.

In some alternate configurations, the productivity application 141 can upload the metadata 130 and/or the contents of the file to the remote service 110. The productivity application 141 or the remote service 110 can notify the synchronization application 142 of the upload. As shown in FIG. 2, in some configurations, the remote service 110 can communicate metadata 130 to the synchronization application 142 causing the synchronization application 142 to update one or records indicating the move. The synchronization application 142 can send a confirmation to the productivity application 141 allowing the productivity application 141 to remove the file.

Returning to FIG. 1, when the requested location is determined to be valid, the productivity application 141 moves the locally-stored file 120 to the requested directory location on the local storage 150 using the updated file name. For example, if the file 120 was opened by the productivity application from Folder A, and the requested directory location is Folder D, the productivity application 141 would move the locally-stored file 120 from Folder A to Folder D. If the request includes an updated name, the productivity application 141 saves the locally-stored file 120 using the updated name.

When the requested location is determined to be valid, the productivity application 141 communicates metadata 130 and the contents of the file 120 to the remote service 110. The metadata 130 includes the requested directory location and the updated file name. Upon receiving the metadata 130, the remote service 110 stores the contents in the remotely-stored file 121 stored on the remote storage 151 using the updated file name at the requested directory location. In the present example, the remote service 110 would move the remotely-stored file 121 from Folder A to Folder D, update the file contents (if needed), and rename the file 121 using the updated file name. In response to receiving the metadata 130, the service 110 causes the synchronization application 142 to update a database record maintained by the synchronization application 142. The record can be updated to associate the requested directory location and/or the updated filename with the locally-stored file 120 and the remotely-stored file 121. Further, when the requested location is determined to be valid, the productivity application 141 maintains a lock on the locally-stored file. The lock prevents the synchronization application from making typography namespace modifications or other modifications to the locally-stored file 120.

In alternate configurations, the productivity application 141 can upload the metadata 130 and/or the contents to the remote service 110. The productivity application 141 or the remote service 110 can then notify the synchronization application 142 of the upload. In response, the synchronization application 142 can update one or more records indicating the move. The synchronization application 142 can send a confirmation to the productivity application 141 allowing the productivity application 141 to move the local file 120.

In other alternative configurations, the productivity application 141 performs the move and keeps track of all the moves it uploaded to the server in a list, and then sends that list to the synchronization application directly. The synchronization application can then match that list against a list it receives from the service 110. Based on a comparison of the list from the productivity application 141 and the list received from the service 110, the synchronization application can determine when to move files or when not to move files that have already been moved by the productivity application 141.

Figure 3:
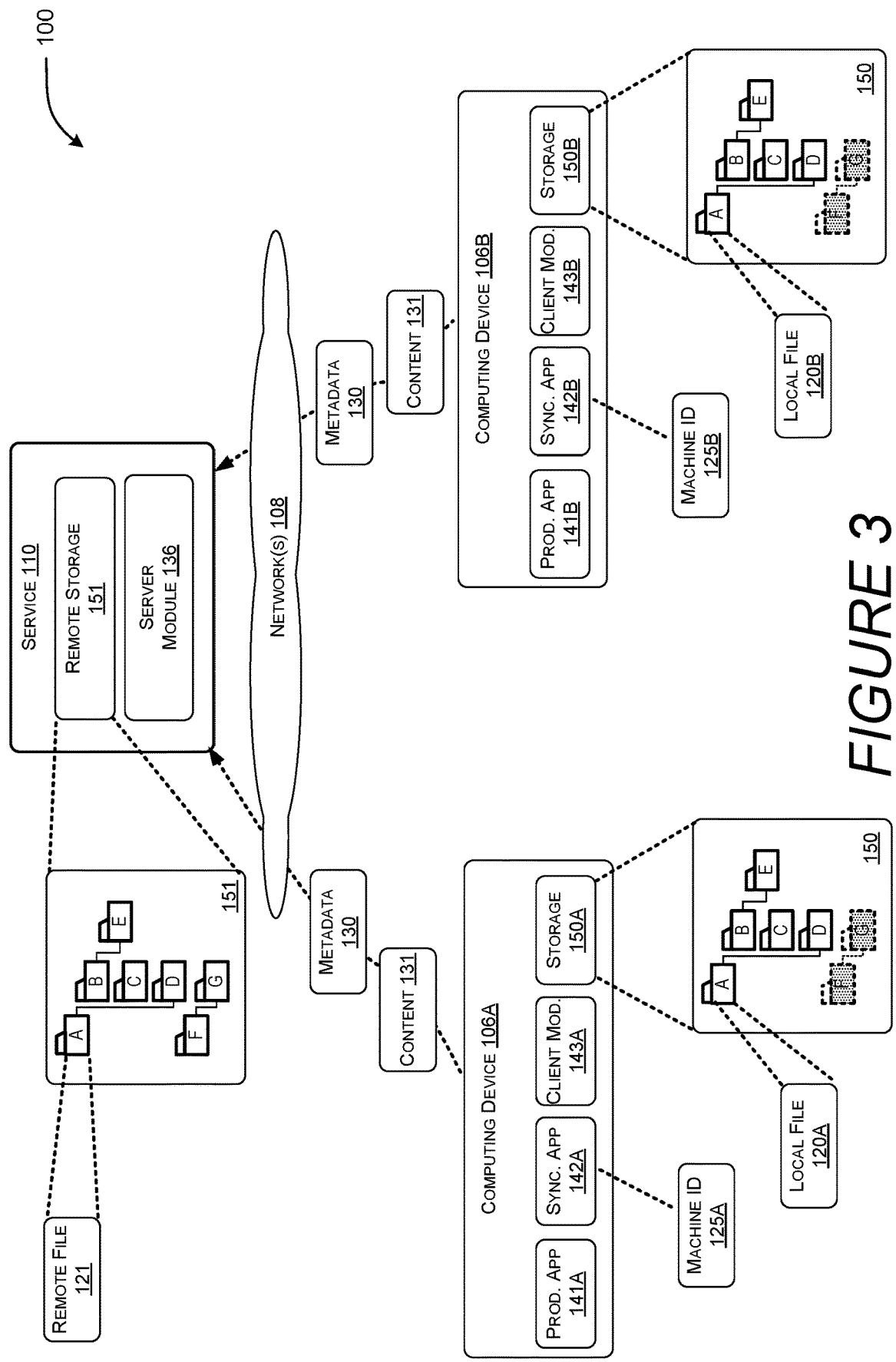
FIG. 3 is a block diagram of a system of FIG. 1 showing multiple client computing devices.

Referring now to FIG. 3, an example of the system 100 involving multiple client computing devices 106 (individually referred to herein as a first computing device 106A and a second computing device 106B) for providing edits to a file that is remotely synchronized on a service 110 is shown and described below. Although the example of FIG. 3 involves two client computing devices for providing edits to a remotely synchronized file, the techniques disclosed herein can involve any number of client computing devices 106.

In this example, the client computing devices 106 and the remote service 110 function as described above. In addition, the metadata 130 communicated from the first computing device 106A comprises a first machine identifier 125A associated with the first client computing device 106A. Similarly, the metadata 130 communicated from the second computing device 106B comprises a second machine identifier 125B associated with the second client computing device 106B. In some configurations, the machine identifier 125 can be generated by the synchronization application 142 and provided to the productivity application 141 and the remote service 110.

The machine identifiers 125 are used by the remote service 110 to determine which computing device provided edits to the remotely-stored file 121. Thus, when the remote service 110 receives metadata 130 and content 131 from the first computing device 106A, the remote service 110 analyzes the received machine identifier 125A to determine that the edits are from the first computing device 106A. When the first computing device 106A is identified, the contents received from the first computing device 106A are stored at the service 110. The metadata 130 and content 131 is also communicated from the remote service 110 to the first synchronization application 142A. The first synchronization application 142A updates a database record stored at the first computing device 106A to indicate the directory location and the updated filename associated with the edited file.

Alternatively, when the remote service 110 receives metadata 130 and content 131 from the second computing device 106B, the remote service 110 analyzes the received machine identifier 125B to determine that the edits are from the second computing device 106B. When the second computing device 106B is identified, the contents received from the second computing device 106B are stored at the service 110. The metadata 130 and content 131 is also communicated from the remote service 110 to the first synchronization application 142A. The first synchronization application 142A updates a database record stored at the first computing device 106A to indicate the directory location and the updated filename associated with the edited file. Thus, in this scenario, edits performed at the second computing device 106B are stored locally at the first computing device 106A. A similar process is mirrored at the second computing device 106B. Thus, when the remote service 110 determines that the most recent edits are made at the second computing device 106B, the local file 120B stored at the second computing device 106B is updated with the edited content generated at the second computing device 106B.

Figure 4A:
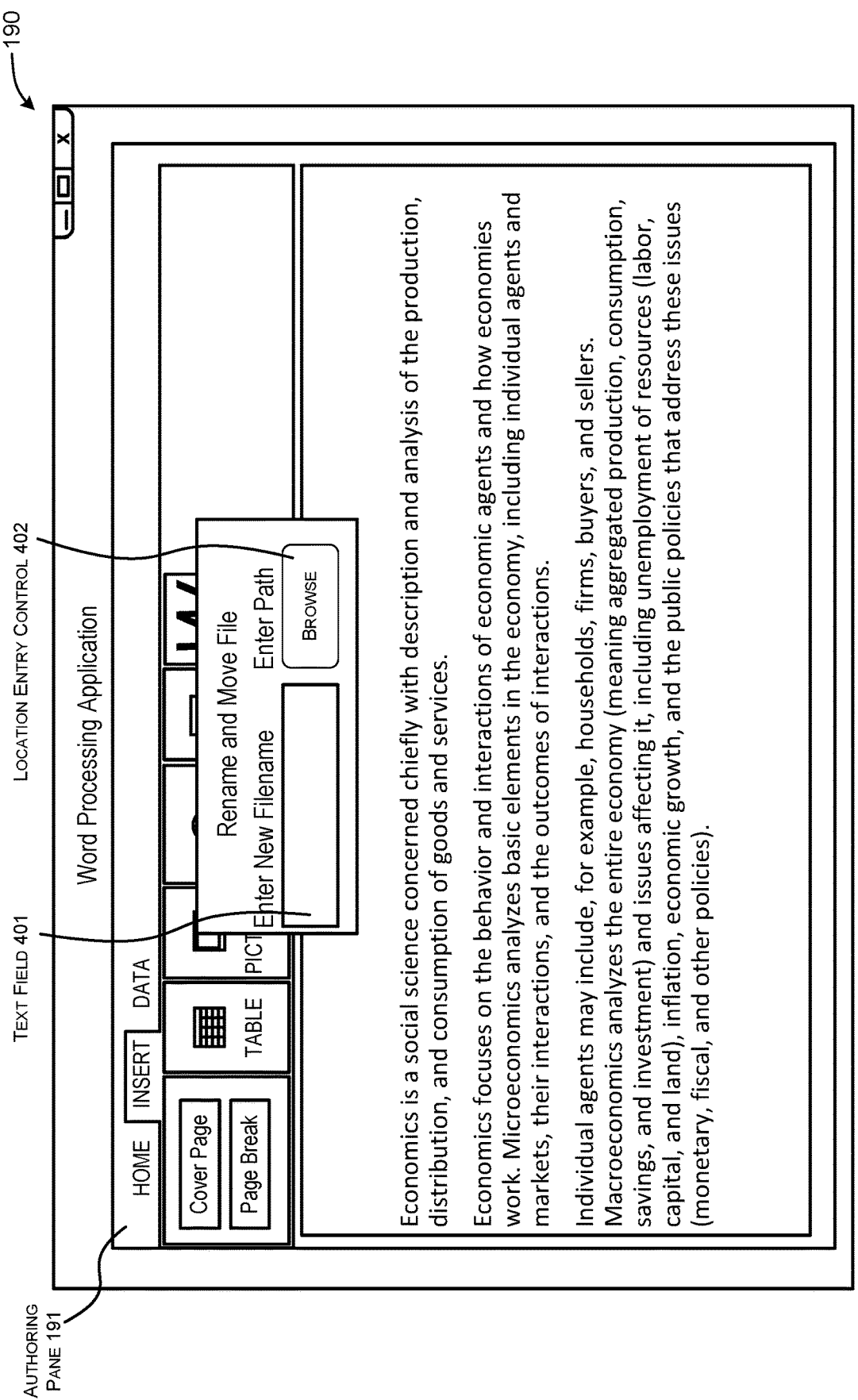
FIG. 4A is a screenshot of a user interface having a text entry field for entering an updated file name.
Figure 4B:
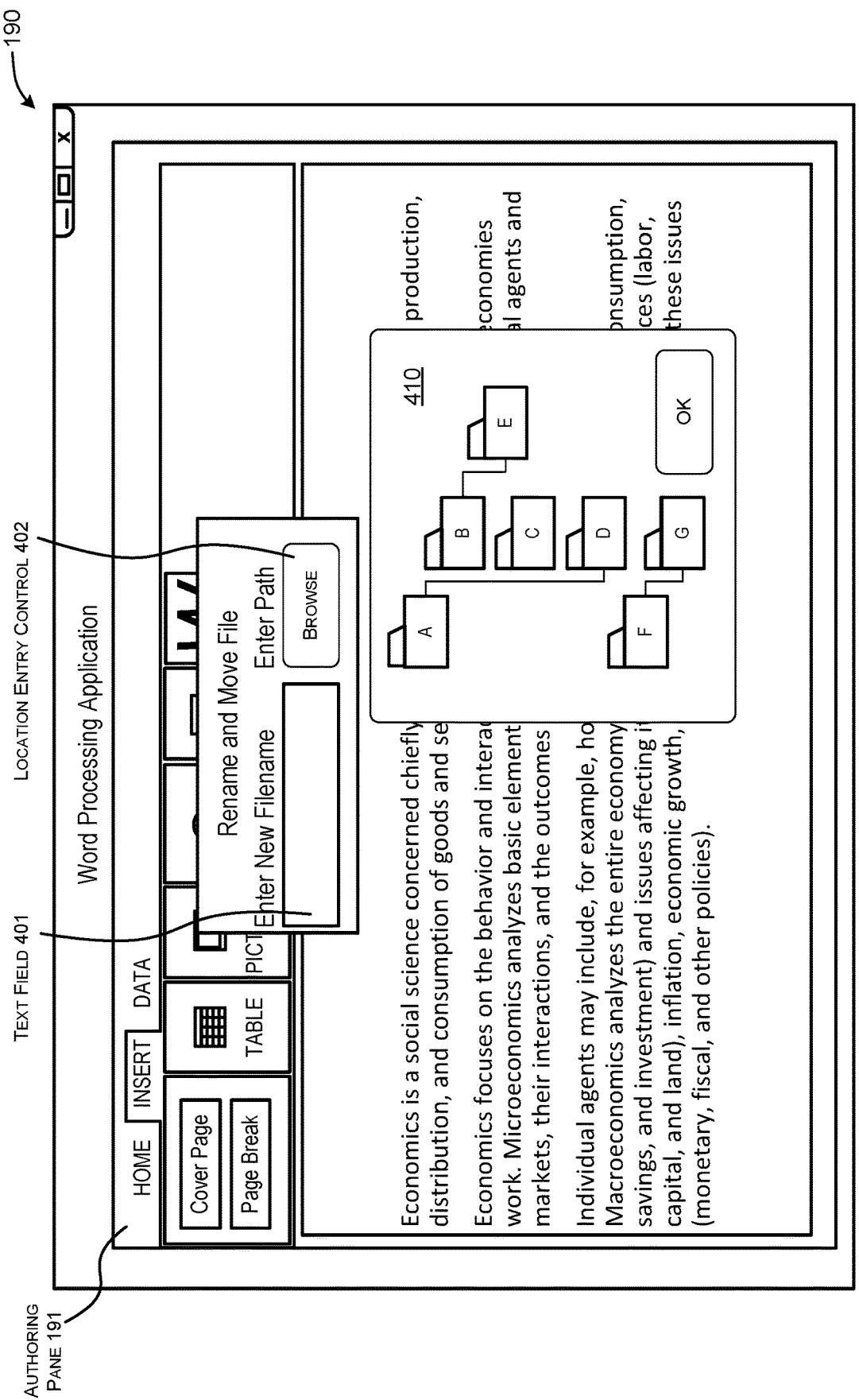
FIG. 4B is a screenshot of a user interface displaying elements for selecting a destination location of a file.

Turning now to FIG. 4A, an example user interface 190 for displaying an authoring pane 191 is shown and described below. As summarized herein, the techniques disclosed herein enable in-application support for topological changes to files during remote synchronization. Also summarized herein, a user can provide a request to make topological changes to a file in a number of ways, such as by a voice command, a gesture, a text entry, etc. FIG. 4A illustrates one example of a user interface for enabling a user to provide a request for making topological changes to a file. In this example, the user interface 190 is of a productivity application, e.g., a word processing application. The user interface 190 can display a menu comprising a text field 401 and a location entry control 402 to enable a user to provide an updated filename and an input indicating a directory location. Upon selection of the location entry control 402, a menu 410 (as shown in FIG. 4B) for displaying a number of directory locations can be displayed. FIG. 4B illustrates one non-limiting example of the menu 410, which includes a number of selectable folders. Upon selection of one of the displayed folders, which can be done by a user gesture interacting with a specific folder, input data indicating a requested directory location, e.g., a destination folder for a file, can be generated by a computer. As summarized above, input data indicating a requested directory location can be in any form, such as audio data defining a voice command of a user, video data defining a gesture performed by a user, etc.

Figure 5:
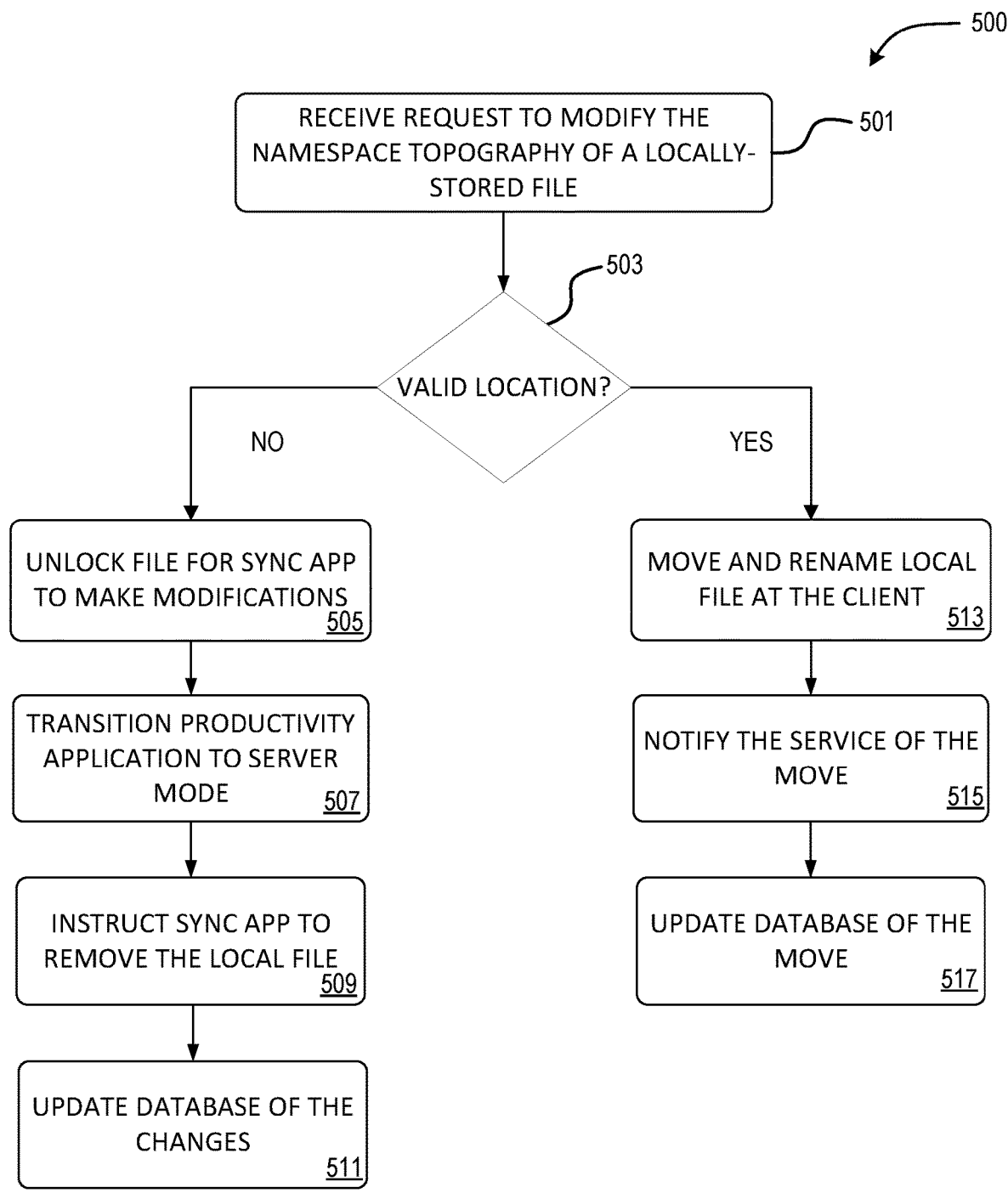
FIG. 5 is a flow diagram showing aspects of a routine for enabling in-application support for topological changes to files during remote synchronization.

Turning now to FIG. 5, aspects of a routine 500 for enabling in-application support for topological changes to files during remote synchronization are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 501 where one or more modules of a computing system receive a request to modify the namespace topography of a local file 120. As described above, a request can be in any suitable format, which may include a voice command captured by a microphone, a keyboard input, an input captured by a pointing device, an input captured by a camera directed to a user performing a gesture, or any other type of input caused by a user or a computer.

The request can identify a desired location where the file 120 is to be stored. The location can be identified in a number of ways, for instance, the location can be identified by a path of file directories, an address, a namespace, or any other suitable data indicating a location within a directory structure. The request can also identify an updated file name. When a user desires to rename a file, the user can provide text or other information in any suitable format defining an updated file name.

Next, at operation 503, the one or more modules of the computing system determines if the requested directory location is valid. A location can be determined to be valid or invalid using a number of different methods. For instance, a directory location may be determined to be valid when an associated folder exists on a local storage 150 and when a user has write permissions to the folder. In some illustrative examples, a location may be determined to be invalid when an associated folder does not exist on the local storage 150. A folder may also be determined to be invalid when an associated folder has not been selected for synchronization with the remote service 110, or when a user does not have appropriate access permissions.

When the requested location is determined to be invalid, the routine 500 proceeds from operation 503 to operation 505 where the productivity application 141 unlocks the local file 120 stored at the client computing device. When the local file 120 is unlocked, the synchronization application 142 can modify one or more of its aspects, including the name and the location, of the locally-stored file 120.

Next, at operation 507, the productivity application 141 transitions to operating in a server mode. While in server mode, the contents of the local file 120 are communicated to the remote service 110. The remote service 110 stores the contents in a remotely-stored file 121 stored on the remote storage 151 at the directory location using the updated file name. The productivity application directs edits to the file 120 received from a user to the remotely-stored file 121 stored on the remote storage 151.

At operation 509, the service 110 or the productivity application 141 causes the synchronization application 142 to remove the locally-stored file 120 from the local storage 150. In alternative configurations, the productivity application 141 can also remove the locally-stored file 120.

At operation 511, the synchronization application 142 updates a database record. The record can be updated to associate the requested directory location and/or the updated filename with the remotely-stored file 121. The record can also be updated to indicate that the locally-stored file has been removed from the local storage 150.

Referring back to operation 503, when the requested location is determined to be valid, the routine 500 proceeds to operation 513 where the productivity application 141 moves the locally-stored file 120 to the requested valid directory location on the local storage 150 using the updated file name. Next, at operation 515, the productivity application 141 notifies the service 110 of the move. In some configurations, operation 515 can involve communication of metadata 130 and the contents of the file 120 to the remote service 110. The metadata 130 includes the requested directory location and the updated file name. Upon receiving the metadata 130, the remote service 110 stores the contents in the remotely-stored file 121 stored on the remote storage 151 using the updated file name at the requested directory location.

At operation 517, the service 110 causes the synchronization application 142 to update a database record maintained by the synchronization application 142. The record can be updated to associate the requested directory location and/or the updated filename with the locally-stored file 120 and the remotely-stored file 121.

FIG. 6 shows additional details of an example computer architecture 600 for a computer, such as the computing device 106 (FIG. 1), capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more application programs, such as a productivity application 141 and a synchronization application 142.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 6. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limiting in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling in-application support for topological changes to files during remote synchronization. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein, such as enabling in-application support for topological changes to files during remote synchronization. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 7. Any device or service depicted herein can be used as a resource for supplemental data, including email servers, storage servers, etc.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by a web browser application, which works in conjunction with the application servers 708 of FIG. 7.

Turning now to FIG. 8, an illustrative computing device architecture 800 for a computing device that is capable of executing various software components described herein for enabling in-application support for topological changes to files during remote synchronization. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIGS. 1, 2, 3 and 7. Moreover, aspects of the computing device architecture 800 may be applicable to traditional desktop computers, portable computers (e.g., phones, laptops, notebooks, ultra-portables, and netbooks), server computers, and other computer systems, such as described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 656 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual- multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for moving or renaming a locally-stored file during synchronization between a client computing device having a local storage and a remote service having a remote storage, the method comprising:

receiving, at a productivity application configured to edit the contents of the locally-stored file stored in the local storage, a request to move or rename the locally-stored file, wherein the request indicates a directory location and an updated file name, and wherein the locally-stored file is opened for editing in the productivity application;

determining whether the directory location is a valid or an invalid directory location for the local storage;

in response to determining that the directory location is invalid, causing the productivity application that is editing the locally-stored file to unlock the locally-stored file to enable a synchronization application to modify the locally-stored file, wherein the synchronization application executes separately from the productivity application, communicating metadata and the contents of the locally-stored file to the remote service, wherein the metadata indicates the directory location and the updated file name, the metadata causing the remote service to store the contents in a remotely-stored file stored on the remote storage using the directory location and the updated file name, causing the productivity application to transition to a server mode enabling communication and storage of edits to the content directly to the remotely-stored file stored on the remote storage, and instructing the synchronization application to remove the locally-stored file from the local storage and update a database record indicating the directory location and the updated file name; and in response to determining that the directory location is valid, causing the productivity application to move or rename the locally-stored file to the directory location on the local storage using the updated file name, communicating the metadata and the contents of the locally-stored file to the remote service, wherein the metadata indicates the directory location and the updated file name, the metadata causing the remote service to store the contents in the remotely-stored file stored on the remote storage using the updated file name and the directory location, wherein the contents are concurrently stored in the remotely-stored file and the locally-stored file, and wherein the productivity application stores edits made to the content directly to the locally-stored file on the local storage, and causing the synchronization application to update the database record indicating the directory location and the updated file name.

2. The method of claim 1, wherein the directory location is valid when the local storage is associated with write permissions for the locally-stored file at the directory location.

3. The method of claim 1, wherein removing the locally-stored file from the local storage comprises: in response to the productivity application transitioning to the server mode, communicating a status change of the locally-stored file from the remote service to the synchronization application causing the synchronization application to remove the file stored in the local storage.

4. The method of claim 3, wherein the update to the database record is made in response to the productivity application transitioning to the server mode, and the record indicates that the remotely-stored file is stored at the directory location of the remote storage unit of the remote service using the updated file name.

5. The method of claim 1, wherein the directory location is determined to be valid when the directory location is associated with a folder that is stored locally on the local storage and also stored at the remote service.

6. The method of claim 1, wherein the directory location is determined to be invalid when the directory location is associated with a folder that does not exist on the local storage or when access permissions to the folder are not met for credentials associated with a user.

7. The method of claim 1, wherein the directory location is determined to be invalid when the directory location does not meet one or more criteria, and wherein the directory location is determined to be valid when the directory location meets the one or more criteria.

8. The method of claim 7, wherein the directory location does not meet one or more criteria when a preference file indicates a first selection to only store the contents of the directory location at the remote service, and wherein the directory location meets the one or more criteria when the preference file indicates a second selection to store the contents of the directory location at the client computing device and at the remote service.

9. The method of claim 1, further comprising, causing the productivity application to maintain a lock on the locally-stored file in response to determining that the directory location is valid, wherein the lock prevents the synchronization application from making typography namespace modifications to the locally-stored file.

10. The method of claim 1, wherein the metadata communicated to the remote service comprises a first machine identifier associated with the client computing device, wherein the remote service causes the synchronization application to update the database record indicating the directory location and the updated filename when the first machine identifier is included in the metadata and when a second machine identifier is not received at the remote service, and wherein the remote service causes the synchronization application to update the database record indicating another directory location and another updated file name when the second machine identifier associated with a second client computer is received at the remote service.

11. The method of claim 1, wherein causing the productivity application to transition to a server mode comprises transitioning from editing the contents of the locally-stored file to editing the contents of the remotely-stored file, wherein the contents of the remotely-stored file comprise or are derived from the contents of the locally-stored file.

12. The method of claim 1, wherein determining that the directory location is an invalid directory location for the local storage comprises determining that the directory location has been configured to be stored at the remote service.

13. The method of claim 1, wherein the edits to the content made while the productivity application is in the server mode are communicated to and stored directly in the remotely-stored file on the remote storage.

14. A computing device comprising:
one or more processing units;
a local storage storing a local file;
a network interface unit for communicating with a remote service having a remote storage; and
a computer-readable medium having encoded thereon computer-executable instructions causing the execution of a productivity application editing the content of the file, wherein the instructions further cause the one or more processing units to execute a method comprising:
receiving a request to move or rename the file, wherein the request indicates a directory location, and wherein the locally-stored file is opened for editing in the productivity application;
determining whether the directory location meets one or more criteria;
in response to determining that the directory location does not meet the one or more criteria,
communicate metadata and the content of the file to the remote service, wherein the metadata indicates the directory location, the metadata and the contents causing the remote service to store the contents in a remotely-stored file stored on the remote storage using the directory location,
cause the productivity application to transition to a server mode enabling communication and storage of edits to the contents from the productivity application to the remotely-stored file stored on the remote storage, wherein the productivity application causes the synchronization application to remove the local file from the local storage and update a database record indicating the directory location; and
in response to determining that the directory location meets the one or more criteria,
cause the productivity application to move the local file to the directory location on the local storage;
communicate the metadata and the contents of the local file to the remote service, wherein the metadata causes the remote service to store the contents in the remotely-stored file at the directory location, wherein the metadata further causes the synchronization application to update the database record indicating the directory location.

15. The computing device of claim 14, in response to the productivity application transitioning to the server mode, communicating a status change of the local file from the remote service to the synchronization application causing the synchronization application to delete the local file stored in the local storage.

16. The computing device of claim 14, wherein the directory location meets the one or more criteria when the directory location is associated with a folder that is stored locally on the computing device and stored at the remote service.

17. The computing device of claim 14, determining that the directory location does not meet the one or more criteria when the directory location is associated with a folder that does not exist on the computing device or when access permissions to the folder are not met for credentials associated with a user.

18. A computer-readable medium having encoded thereon computer-executable instructions causing one or more processing units of a computing device to execute a productivity application for editing the contents of the local file, the instructions enabling communication of metadata and contents of a local file between a local storage of the computing device, and wherein the instructions further cause the one or more processing units to execute a method comprising:
receiving a request to move or rename the local file, wherein the request indicates a directory location, and wherein the locally-stored file is opened for editing in the productivity application;
determining whether the directory location meets one or more criteria;
in response to determining that the directory location does not meet the one or more criteria,
while the local file is open for editing by the productivity application that is editing the locally-stored file, communicate metadata and the contents of the local file to the remote service, wherein the metadata indicates the directory location, the metadata and the contents causing the remote service to store the contents in a remotely-stored file stored on the remote storage using the directory location, wherein the productivity application causes the synchronization application to remove the local file from the local storage and update a database record indicating the directory location; and in response to determining that the directory location meets the one or more criteria,
> while the local file is open for editing by the productivity application, causing the productivity application to move the local file to the directory location on the local storage; and
> communicate the metadata and the contents of the local file to the remote service, wherein the metadata causes the remote service to store the contents in the remotely-stored file at the directory location, wherein the metadata further causes the synchronization application to update the database record indicating the directory location.

19. The computing device of claim 18, wherein the directory location meets the one or more criteria when the directory location at the local storage is associated with write permissions to save the file at the directory location.

20. The computing device of claim 18, further comprising causing the productivity application to transition to a server mode enabling communication and storage of edits to the content from the productivity application directly to the remotely-stored file.

\* \* \* \* \*